(12) United States Patent  
Jennings et al.

(10) Patent No.: US 8,725,979 B1
(45) Date of Patent: May 13, 2014

(54) EFFICIENT METHODS AND SYSTEMS FOR ALLOCATING STORAGE VOLUMES

(75) Inventors: Logan R. Jennings, Menlo Park, CA (US); Kevin Jamieson, North Vancouver (CA); Gobikrishnan Sundharraj, Santa Clara, CA (US)

(73) Assignee: Netapp, Inc., Sunnyvale, CA (US)

( * ) Notice: Subject to any disclaimer, the term of this patent is extended or adjusted under 35 U.S.C. 154(b) by 184 days.

(21) Appl. No.: 13/361,848

(22) Filed: Jan. 30, 2012

(51) Int. Cl.
*G06F 12/02* (2006.01)

(52) U.S. Cl.
USPC ......... 711/170; 711/112; 711/114; 707/999.2

(58) Field of Classification Search
USPC .................................. 711/170, 162, 114, 112
See application file for complete search history.

(56) References Cited

U.S. PATENT DOCUMENTS

| | | | |
|---|---|---|---|
| 6,609,213 B1 * | 8/2003 | Nguyen et al. ............... | 714/4.12 |
| 7,617,370 B2 * | 11/2009 | Jernigan et al. .............. | 711/165 |
| 2007/0239793 A1 * | 10/2007 | Tyrrell et al. ................. | 707/200 |
| 2007/0253411 A1 * | 11/2007 | Arad et al. .................... | 370/389 |
| 2008/0189343 A1 * | 8/2008 | Hyer et al. .................... | 707/205 |
| 2009/0077302 A1 * | 3/2009 | Fukuda ......................... | 711/103 |
| 2011/0040935 A1 * | 2/2011 | Murayama et al. ........... | 711/114 |
| 2012/0011329 A1 * | 1/2012 | Nonaka ........................ | 711/154 |

FOREIGN PATENT DOCUMENTS

EP     1818797 A2 *  8/2007

OTHER PUBLICATIONS

Ashton et al, Two decades of Policy-based storage management for the IBM mainframe computer, IBM Systems Journal, vol. 42, No. 2, 2003, pp. 302-321.*

* cited by examiner

*Primary Examiner* — Mardochee Chery
*Assistant Examiner* — Kamal K Dewan
(74) *Attorney, Agent, or Firm* — Klein, O'Neill & Singh, LLP

(57) ABSTRACT

A machine implemented method and system for allocating a storage volume from among a plurality of storage volumes for storing information in a storage system is provided. The storage system maintains a plurality of groups for segregating the plurality of storage volumes based on storage volume utilization at any given time. A storage volume, when available, is selected from a group that was previously used to select another storage volume. After an end of the group has been reached for allocating the other storage volume, and a threshold value for using the same group to allocate storage volumes has been reached, then another group is used to select the next storage volume.

22 Claims, 6 Drawing Sheets

US 8,725,979 B1

EFFICIENT METHODS AND SYSTEMS FOR ALLOCATING STORAGE VOLUMES

TECHNICAL FIELD

The present disclosure relates to storage systems.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device, an aggregate of some or all of the storage space in multiple storage devices.

The need for electronic storage continues to increase with the rapid growth of the Internet, social media and electronic commerce. As storage space continues to grow in data centers, it is desirable for a storage operating system to optimally select storage volumes for storing client data. Conventional techniques randomly select a storage volume from among a plurality of available storage volumes at any given time. The random selection may be undesirable in an environment where a large amount of information is moved to and from storage devices. Continuous efforts are being made to streamline the process for allocating and managing storage volumes.

SUMMARY

In one embodiment, a machine implemented method and system for allocating a storage volume from among a plurality of storage volumes for storing information in a storage system is provided. The storage system maintains a plurality of groups for segregating the plurality of storage volumes based on utilization of the plurality of storage volumes. A storage volume, when available, is selected from a group that was previously used to select another storage volume. After an end of the group has been reached for allocating the other storage volume, and a threshold value for using the same group to allocate storage volumes has also been reached, then another group is used to select the next storage volume.

In another embodiment, a machine implemented method for allocating a storage volume from among a plurality of storage volumes for storing information in a storage system is provided. The method includes determining if a counter associated with a group used for previously selecting another storage volume has reached a threshold value, after an end of the group has been reached for allocating the other storage volume. The storage system maintains a plurality of groups for segregating the plurality of storage volumes based on utilization of each of the plurality of storage volumes; and the counter is used to determine a number of times the group can be used to allocate storage volumes.

The method further includes starting at a beginning of the group for selecting the storage volume, when the counter has not reached the threshold value; selecting a next group from among the plurality of groups after the counter has reached the threshold value; and selecting a storage volume from the next group.

In yet another embodiment, a machine implemented method for allocating a storage volume from among a plurality of storage volumes for storing information in a storage system is provided. The method includes maintaining a plurality of groups for segregating the plurality of storage volumes based on utilization of the plurality of storage volumes; and determining if a counter associated with a group that was previously used to provide another storage volume has reached a threshold value. The counter is used to determine a number of times the group can be used to allocate storage volumes.

The method further includes starting at a beginning of the group for selecting the storage volume, when the counter has not reached the threshold value; selecting a next group from among the plurality of groups, when the counter has reached the threshold value; and selecting a storage volume from the next group.

In another embodiment, a machine implemented method for allocating a storage volume from among a plurality of storage volumes for storing information in a storage system is provided. The method includes maintaining a plurality of groups for segregating the plurality of storage volumes based on utilization of the plurality of storage volumes; determining if a threshold value for using a group that was previously used to select another storage volume has been reached; starting at a beginning of the group for selecting the storage volume, when the threshold value is not reached.

The method further includes selecting a next group from among the plurality of groups, when the threshold value has been reached; and selecting a storage volume from the next group.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Storage Environment 100

Figure 1:
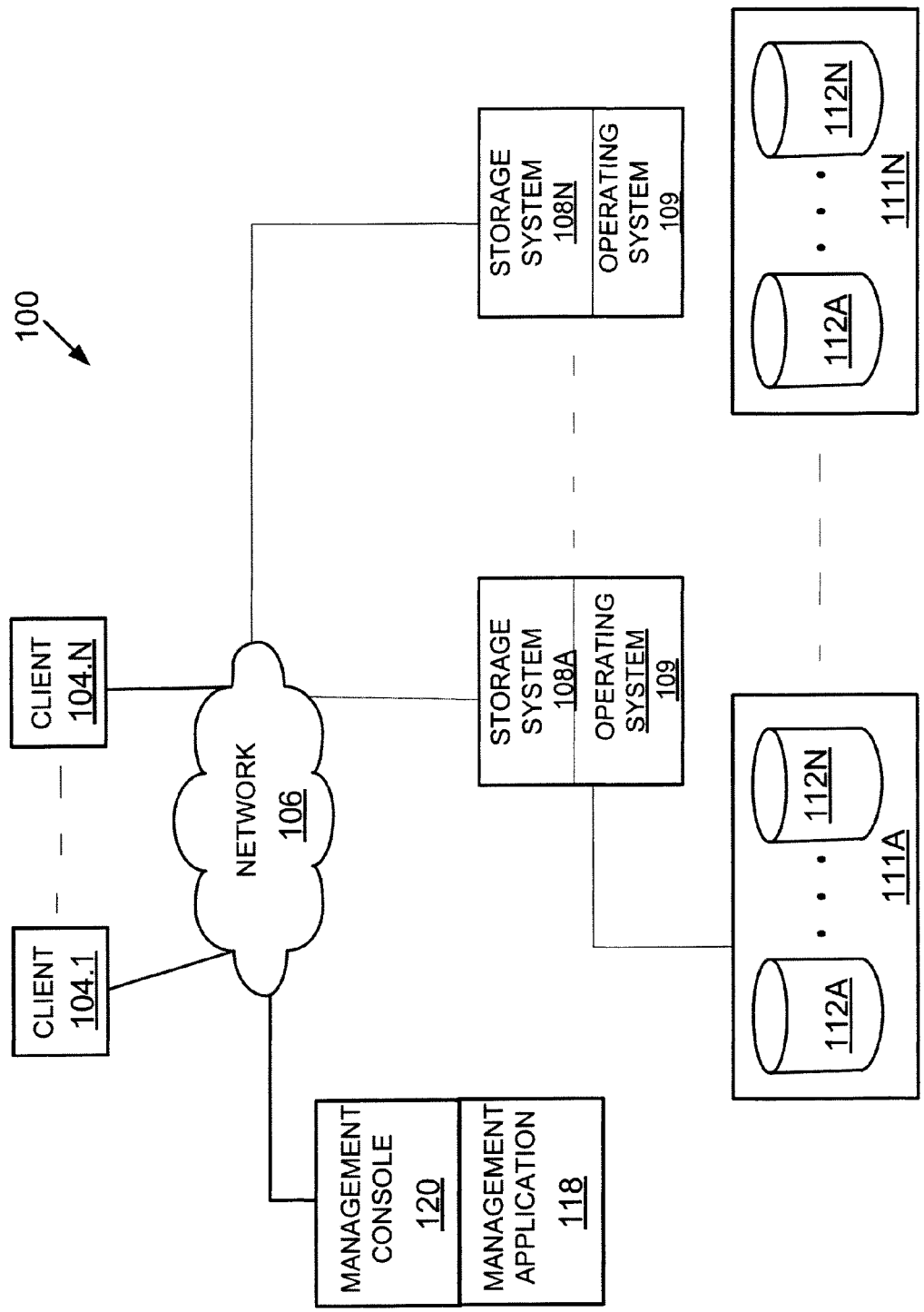
FIG. 1 shows an example of a storage environment using a non-clustered storage system, according to one embodiment.

FIG. 1 depicts a non-cluster based storage environment 100 having a plurality of storage devices and storage systems, used according to one embodiment. As described below, the storage systems present a plurality of storage volumes to clients for storing information.

In one embodiment, a machine implemented method and system for allocating a storage volume from among a plurality of storage volumes for storing information in a storage system of storage environment 100 is provided. As described below in detail, the storage system maintains a plurality of groups for segregating the plurality of storage volumes based on utilization of the plurality of storage volumes. A storage volume, when available, is selected from a group that was previously used to select another storage volume. After an end of the group has been reached for allocating the other storage volume, and a threshold value for using the same group to allocate storage volumes has also been reached, then another group is used to select the next storage volume.

Referring to FIG. 1, the storage environment 100 may include a plurality of client systems 104.1-104.N (also referred to as client 104), storage systems 108A-108N (also referred to as storage system 108), a management console 120 and at least one network 106 communicably connecting client systems 104.1-104.N, storage systems 108 and management console 120. Network 106 may a local area network (LAN), wide area network (WAN), the Internet and others. As described herein, the term "communicably connecting" may refer to a direct connection, a network connection, or other connections to enable communication between devices.

Clients 104.1-104.N as described below in more detail may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Each storage system 108 may include or has access to a storage subsystem 111 (shown as 111A-111N) having multiple mass storage devices 112A-112N (may also be referred to as storage devices 112). The mass storage devices 112 may be, for example, conventional magnetic disks, optical disks such as CD-ROM or DVD based storage, magneto-optical (MO) storage, flash based storage devices or any other type of non-volatile storage devices suitable for storing structured or unstructured data.

The storage system 108 executes a storage operating system 109 for managing storage space within storage subsystem 111 and presenting the storage space to clients 104. As an example, storage operating system 109 may be the DATA ONTAP® storage operating system, available from NetApp®, Inc., that implements a Write Anywhere File Layout (WAFL®) storage system, or any other suitable storage operating system.

Storage operating system 109 and applications running on the client systems 104.1-104.N communicate according to well-known protocols, such as the NFS (Network File System) protocol or the CIFS (Common Internet File System) protocol, to make data stored on storage device 112 appear to users and/or application programs as though the data were stored locally on the client systems 104.1-104.N.

Storage operating system 109 presents or exports data stored at storage devices 112 as a storage volume (may also be referred to as a volume) to client systems 104.1-104.N. In one embodiment, a storage volume is a logical data set which is an abstraction of physical storage, combining one or more physical mass storage devices or parts thereof into a single logical storage object.

A storage volume may be configured to store data containers, scripts, word processing documents, executable programs and any other type of structured or unstructured data. The term data container as used herein means a block, a file, a logical unit of data or any other information. Each storage volume can represent storage space in one storage device, an aggregate of some or all of the storage space in multiple storage devices, a RAID (redundant array of inexpensive disks) group, or any other suitable set of storage space. The process for selecting and allocating storage volumes is described below in detail.

In a typical mode of operation, one of the client systems transmit one or more I/O (input/output) commands, such as an NFS or CIFS request, over network 106 to the storage system 108. The storage system 108 issues one or more I/O commands to storage device 112 to read or write the data on behalf of the client system. The storage system 108 also issues an NFS or CIFS response containing the requested data over network 106 to the client system.

The various storage devices including storage volumes can be configured and managed by using a management application 118 executed by management console 120. In one embodiment, as described below management console 120 may be, for example, a conventional PC, workstation, or the like.

Communication between the management application 118 and storage system 108 may be accomplished using any of the various conventional communication protocols and/or application programming interfaces (APIs), the details of which are not germane to the technique introduced herein. This communication can be enabled by network 106 or via a direct link (not shown).

Clustered System

Figure 2A:
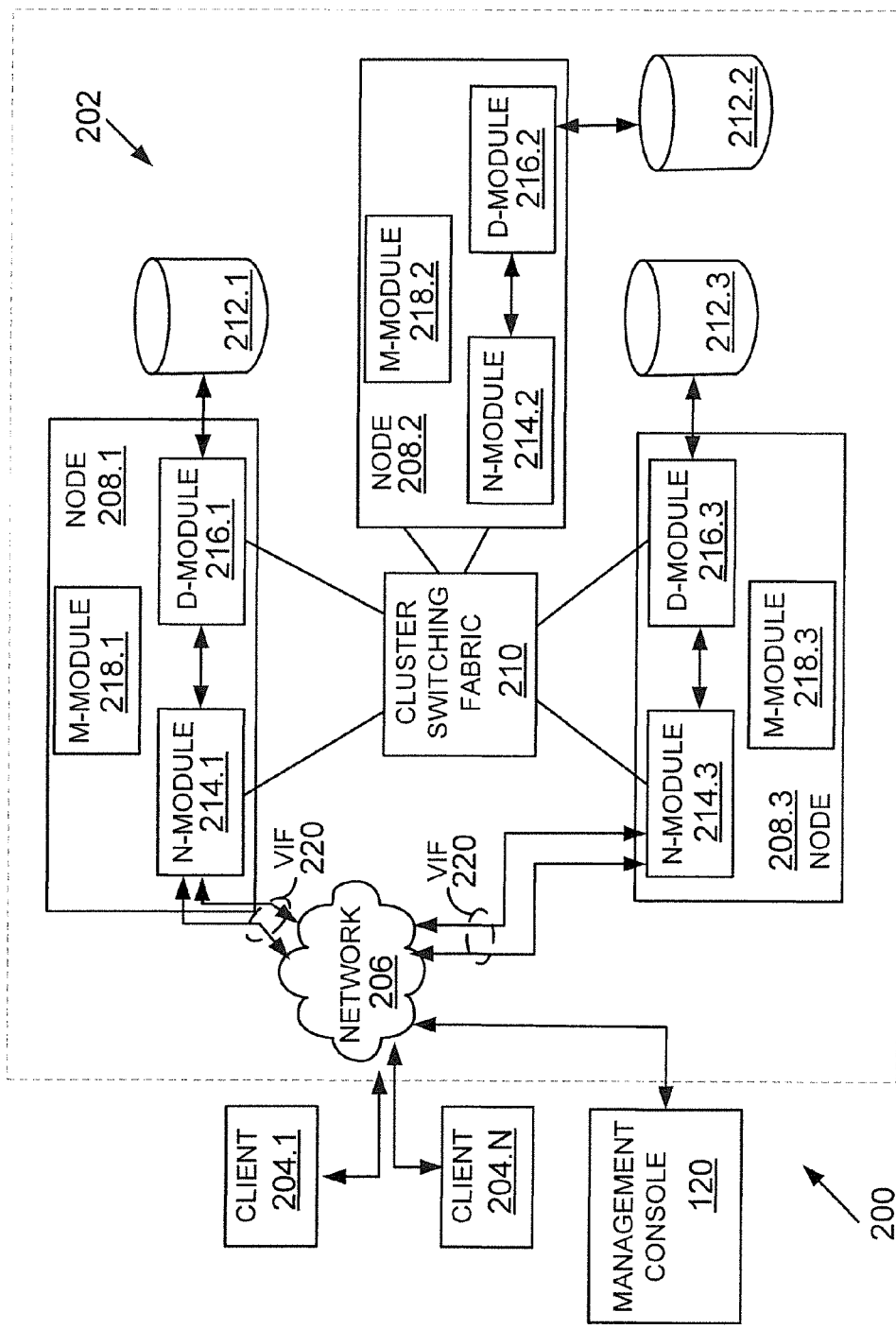
FIG. 2A shows an example of a storage environment using a clustered storage system, according to one embodiment.

FIG. 2A shows a cluster based storage environment 200 having a plurality of nodes for allocating a plurality of storage volumes for storing information, according to one embodiment. A node maintains a plurality of groups for segregating the plurality of storage volumes based on utilization of the plurality of storage volumes. A storage volume, when available, is selected from a group that was previously used to select another storage volume. After an end of the group has been reached for allocating the other storage volume, and a threshold value for using the same group to allocate storage volumes has also been reached, then another group is used to select the next storage volume.

Storage environment 200 may include a plurality of client systems 204.1-204.N (similar to 104.1-104.N), a clustered storage system 202, management console 120 and at least a network 206 communicably connecting the client systems 204.1-204.N and the clustered storage system 202. As shown in FIG. 2A, the clustered storage system 202 includes a plurality of nodes 208.1-208.3, a cluster switching fabric 210, and a plurality of mass storage devices 212.1-212.3 (may be referred to as 212 and similar to storage device 111).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212 and makes it available to clients and/or storage operating systems. The storage device information includes storage device utilization (or capacity utilization) that is used to allocate storage volumes, as described below in more detail.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative embodiments, the clustered storage system 202 may include a plurality of N-modules and a plurality of D-modules interconnected in a configuration that does not reflect a one-to-one correspondence between the N-modules and D-modules.

The client systems 204.1-204.N of FIG. 2A may be implemented as general-purpose computers configured to interact with the respective nodes 208.1-208.3 in accordance with a client/server model of information delivery. In the presently disclosed embodiment, the interaction between the client systems 204.1-204.N and the nodes 208.1-208.3 enable the provision of network data storage services.

Specifically, each client system 204.1, 204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.N may issue packets according to file-based access protocols, such as the NFS or CIFS protocol, when accessing information in the form of files and directories.

Allocating Storage Volumes

Figure 2B:
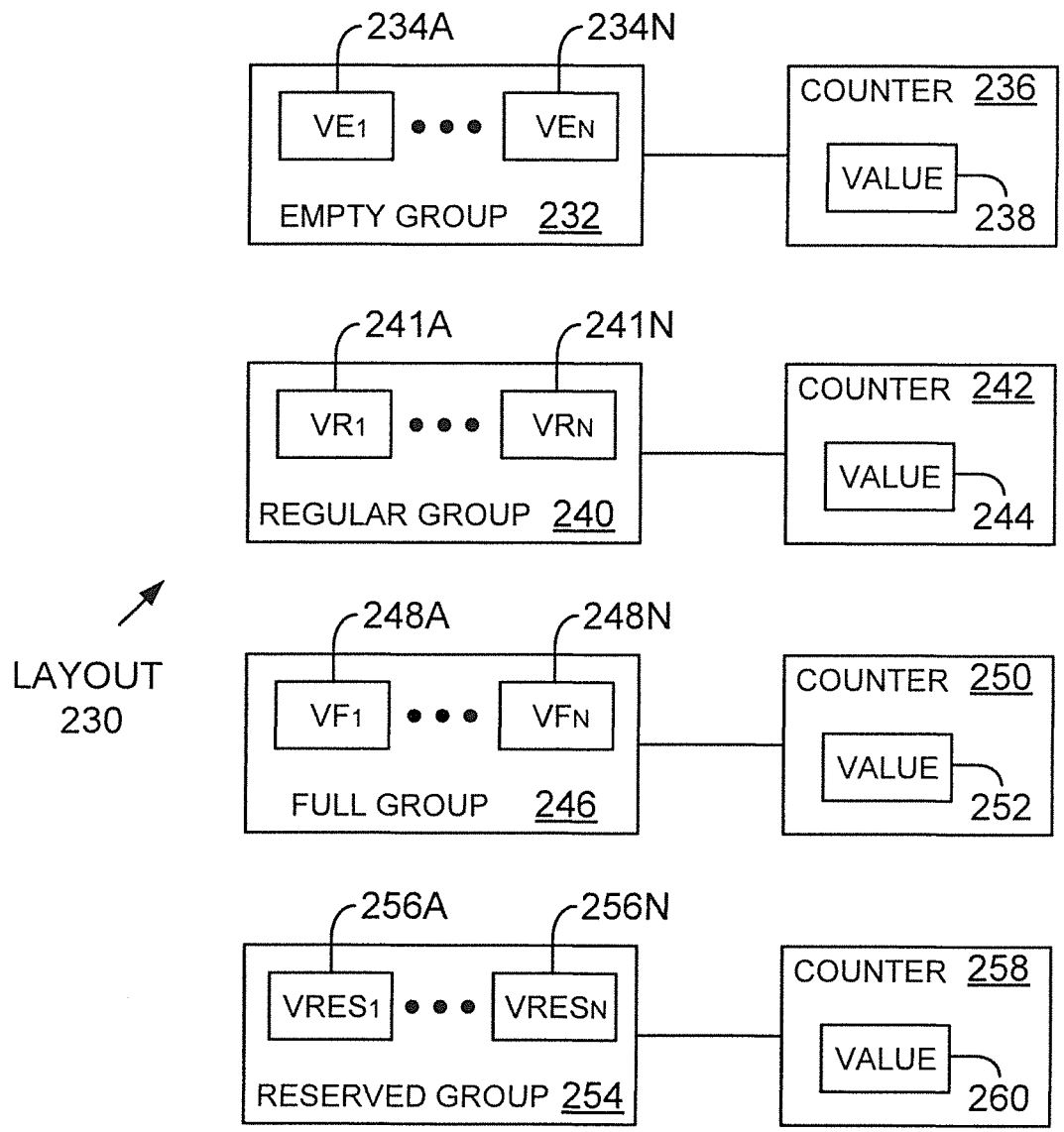
FIG. 2B shows an example of a layout for allocating storage volumes, according to one embodiment.

FIG. 2B shows an example of a layout 230 used by storage operating system 109 for allocating storage volumes for storing information, according to one embodiment. The storage volumes may be allocated in response to user requests or otherwise.

Layout 230 maintains a plurality of groups, for example, an empty group 232, a regular group 240, a full group 246 and a reserved group 254. The storage volumes are assigned to a particular group based on storage volume utilization. The term storage volume utilization (or utilization) as used herein means a percentage of a storage volume that is used at any given time or is available at any given time. The storage volume utilization may be based on a plurality of factors, for example, amount of storage space used at any given time, transfer rates for processing I/O requests, number of client systems that access storage space within storage devices 112 and others. The storage volume utilization may be determined before an existing input/output request is completed such that a next request is optimally handled.

Typically, since storage operating system 109 executes input/output operations for reading and writing information it can also track storage volume utilization, which is then used for maintaining layout 230. In one embodiment, layout 230 may be maintained as a data structure by processor executable code at an N-module. The processor-executable code for maintaining layout 230 may be integrated with the storage operating system 109 or functions as an independent module. It is noteworthy that the adaptive embodiments are not limited to where and which component maintains layout 230.

The empty group 232 may include a plurality of storage volumes (VE1-VEN) 234A-234N. A storage volume can be categorized as empty when its utilization reaches a certain programmable threshold level of utilization. For example, a storage volume that is utilized 20% or less, may be considered to be "empty" and is assigned to the empty group.

The regular group 240 may include a plurality of storage volumes (VR1-VRN) 241A-241N. A storage volume can be categorized as "regular" when its utilization reaches a certain programmable, threshold level of utilization. For example, a storage volume whose utilization is between 20%-50%, may be considered to be regular and is assigned to the regular group 240.

The reserved group 254 includes a plurality of storage volumes (VRES1-VRESN) 256A-256N. The reserved storage volumes may be used by the storage operating system 109 after attempting to select volumes from the empty group 232 and the regular group 240 and determining no volumes exist in those groups.

The full group 246 includes a plurality of storage volumes (VF1-VFN) 248A-248N. A storage volume may be categorized as "full" when its utilization reaches a certain programmable, threshold level of utilization. For example, a storage volume with utilization greater than 80% may be considered to be full and is assigned to the full group 246.

In one embodiment, each group is associated with a counter (for example, 236, 242, 250 and 258) that tracks a number of times a group is traversed for allocating a storage volume. For example, counter 236 is associated with empty group 232 and maintains a count value 238. The count value indicates a number of times the storage operating system has traversed from VE1-VEN to allocate a storage volume.

Similar to counter 236, counter 242 is associated with regular group 240 and maintains a count value 244; counter 250 is associated with the full group 246 and maintains a count value 252; and counter 258 is associated with the reserved group 254 and maintains a count value 258.

Figure 2C:
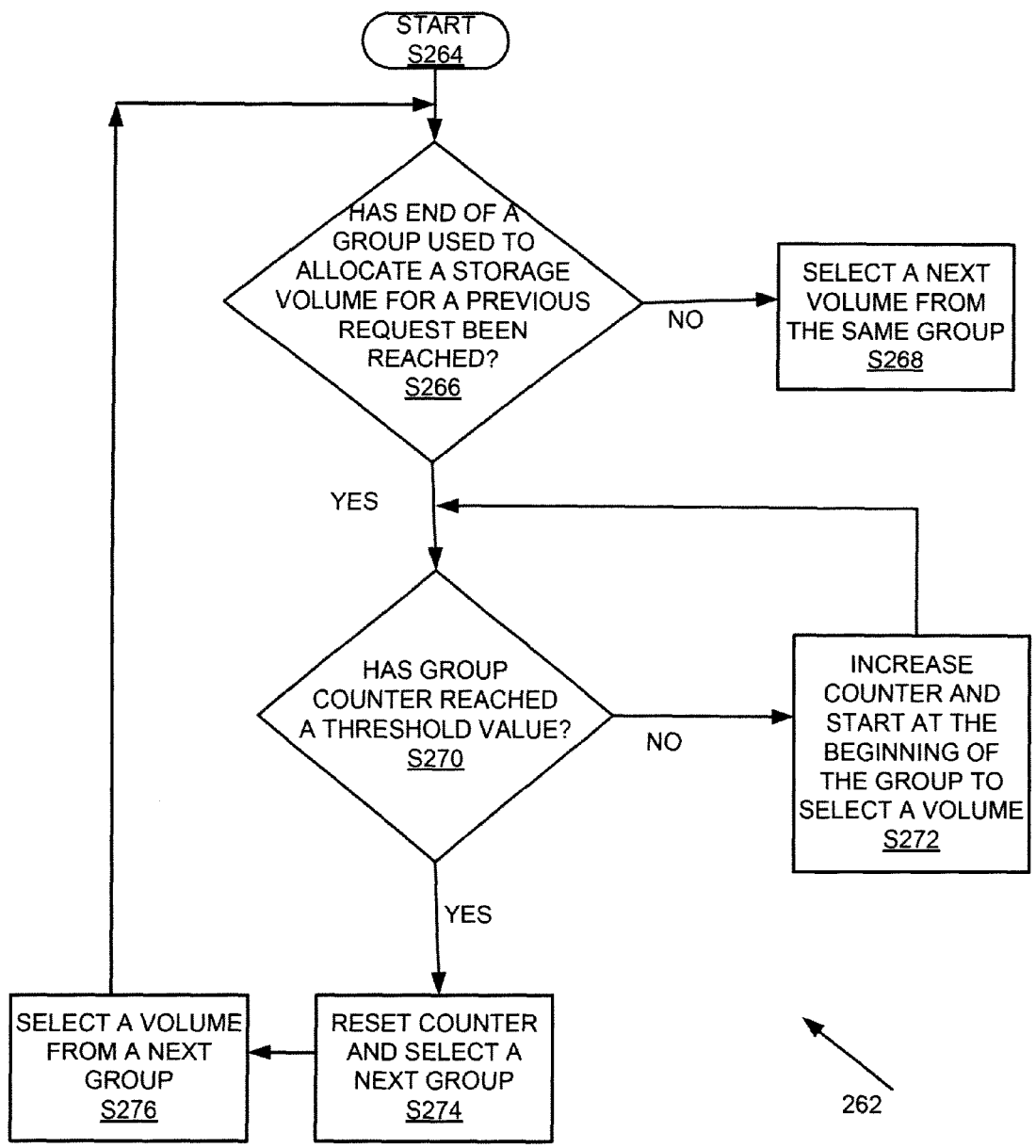
FIG. 2C shows a process flow diagram for allocating storage volumes, according to one embodiment.

In one embodiment, the storage operating system 109 first traverses through the empty group 232 for a certain number of times to select storage volumes. For example, the storage operating system 109 may select storage volumes from among VE1-VEN twice, before moving on to the regular group 240. This enables the storage operating system 109 to select the least utilized volumes first. After the regular group is traversed once, the reserved group 254 is traversed for selecting storage volumes. Once the reserved group has been traversed once, the storage operating system 109 starts again from the empty group 232. The full group 246 is rarely used because it includes storage volumes that have already been utilized. The use of the various counters and the various groups is now described below with respect to the process flow 262 of FIG. 2C.

The process 262 begins in block S264, after the storage operating system 109 has allocated a storage volume at a given time and selects a next volume that can be allocated in response to a future request or for any other reason. The storage system 109 tracks the volumes that are allocated in response to I/O requests in a data structure (not shown) at any given time. The data structure may store an identifier for identifying each storage volume and an identifier for identifying each request. The storage system 109 is thus aware of a current storage volume allocated for a most recent request and the next volume that it will have to allocate in response to a future request (or the next request).

In block S266, the storage operating system 109 determines if it has reached an end of a group from which the previous storage volume was selected in block S264. The storage operating system 109 is aware of all the volumes within each group shown in FIG. 2B. As described above, the storage operating system 109 maintains the data structure (not shown) for tracking volumes that have been allocated at any given time. Since the storage operating system 109 is also aware of all the volumes within each group, it can use the data structure to determine if it has reached the end of a group. The storage operating system 109 performs this step to determine if the "next" storage volume is available from the group used in block S264. For example, if VE1 234A was allocated from the empty group 232 for a request in block S264, then a next storage volume (for example, VE2) is considered available because the end of the empty group has not been reached.

If the end of the group has not been reached i.e. a storage volume is available from the same group, then in block S268, the next storage volume is selected from the same group for allocation. For example, if VE1 was allocated in response to the first request in block S264, then VE2 may be selected for allocation for the next request.

If another storage volume is unavailable, i.e. the storage operating system 109 has reached the end of the group, then in block S270, the storage operating system 109 determines if a current count of the counter that is associated with the group has reached a programmable threshold value. Continuing with the example above, the process determines if counter value 238 has reached its threshold value. The threshold value is used to determine whether the storage operating system 109 can traverse (or use) the same group to allocate a storage volume or move to a next group.

In one embodiment, the threshold value for selecting a group from a current group may be different. For example, the threshold value for the empty group may be 2, indicating that the storage operating system 109 can traverse through the empty group twice before moving on to a next group. The threshold value for a regular group 240 may be 1 and the threshold for a reserved group may also be 1.

The various threshold values are programmable via management console 120 and may be based on different operating conditions such as transfer rates for processing I/O requests, number of client systems that access storage space within storage devices 112 and others.

If the counter value has not reached a threshold value, then in block S272, the counter value is increased and the storage operating system 109 selects a storage volume from the beginning of the group.

If the counter value has reached the threshold value, then in block S274, the counter is reset and the storage operating system 109 moves on to select another group. In one embodiment, the storage operating system 109 first selects from the empty group 232 and then the regular group 240. If storage volumes are not available at either the empty group 232 or the regular group 240, then the reserved group 254 may be used. Thereafter, in block S276, a next volume is selected from the group selected in block S274. The selected volume is allocated when a request for a storage volume is received or if the storage operating system 109 decides to allocate the selected storage volume. Thereafter, the process moves back to block S266.

The process and system described above optimize storage volume allocation since storage volumes are allocated based on utilization. This reduces the possibility of allocating space from a storage volume that may be over-utilized, while other storage volumes may be available and under-utilized.

Storage System Node

Figure 3:
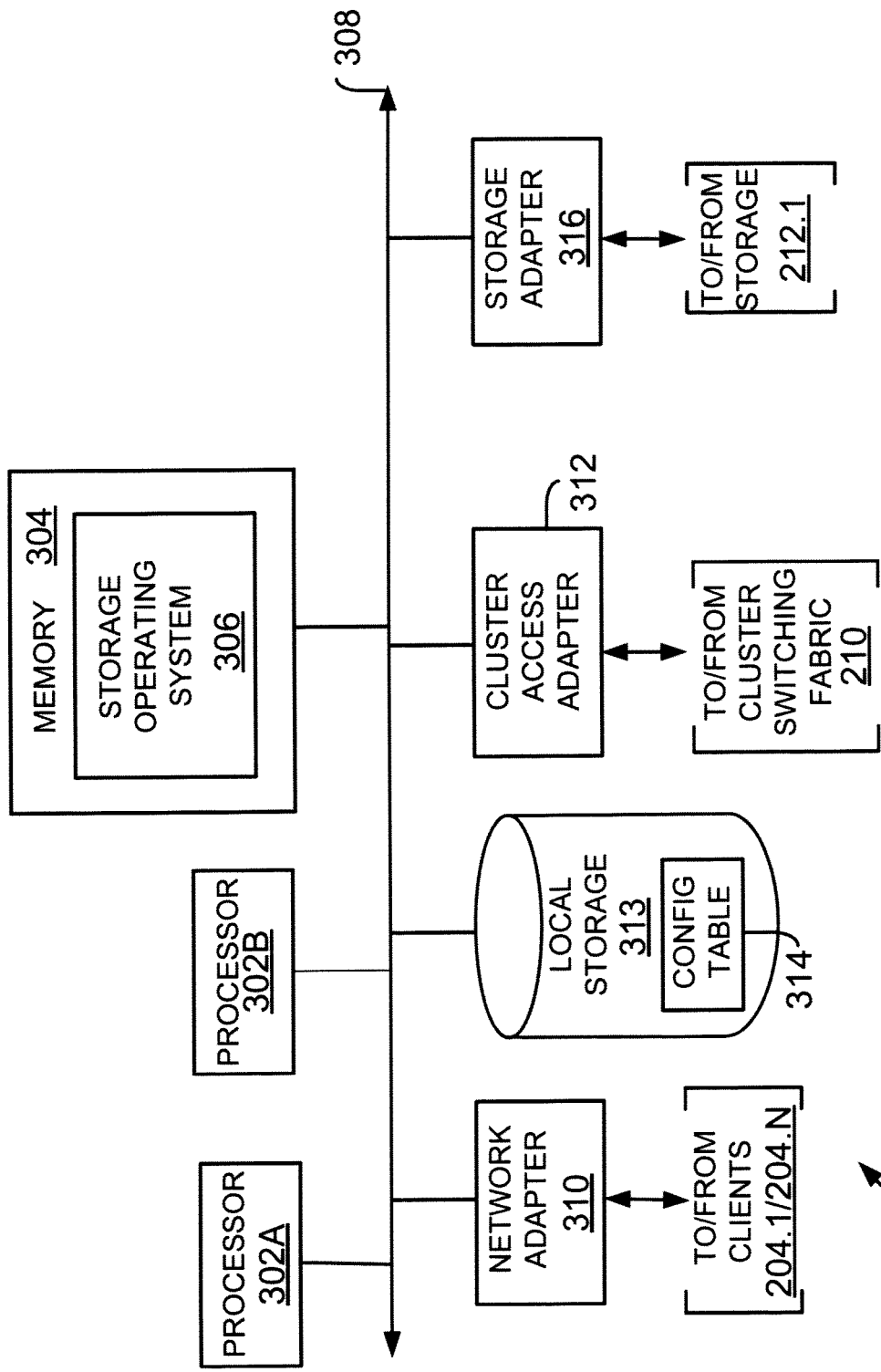
FIG. 3 shows an example of a node used in a cluster based storage system, according to one embodiment.

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. In one embodiment, processors 302A-302B execute instructions for implementing the process steps of FIG. 2C and for maintaining layout 230 of FIG. 2B.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration table 314. The configuration information may include the threshold values for the various counters described above with respect to FIGS. 2B and 2C.

The cluster access adapter 312 comprises a plurality of ports adapted to couple node 208.1 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306 that uses the various groups (for example, 232, 240, 246, 254) and counters 236, 242, 250 and 258 described above in detail for allocating storage volumes, portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Operating System

Figure 4:
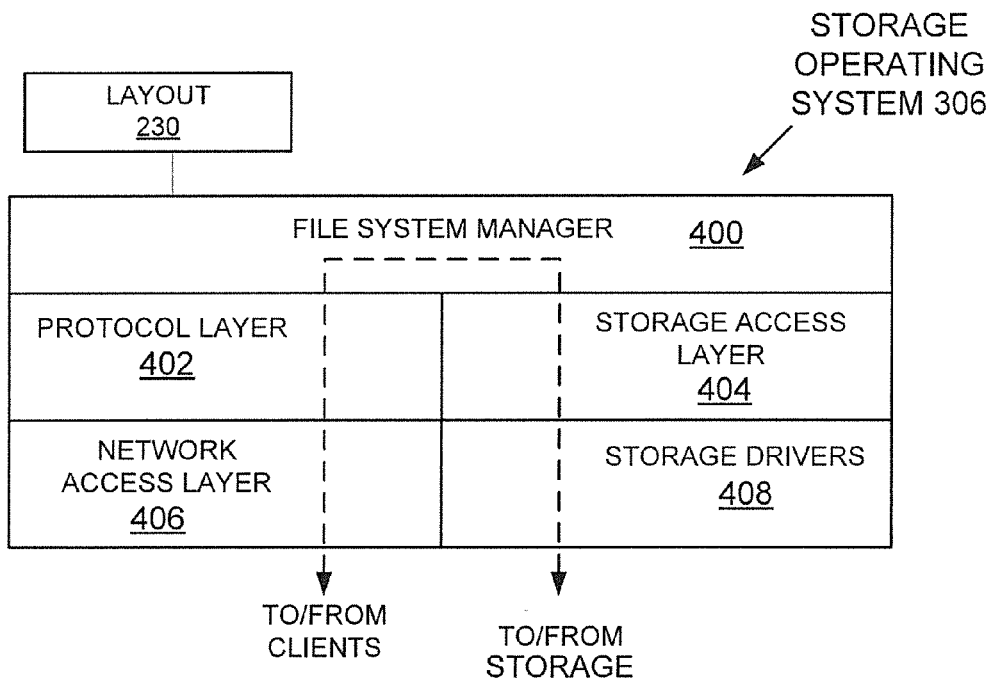
FIG. 4 shows an example of a storage operating system, used according to one embodiment.

FIG. 4 illustrates a generic example of storage operating system 306 (or 109, FIG. 1) executed by node 208.1, according to one embodiment of the present disclosure. Storage operating system 306 maintains one or more data structures for implementing layout 230 described above. Storage operating system 306 also tracks which group is being used by maintaining a plurality of counters, described above with respect to FIG. 2B. Storage operating system 306 allocates storage volumes using layout 230 and executing some or all of the process steps of FIG. 2C.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients 204.1/204.N and mass storage devices 212.1 are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Processing System

Figure 5:
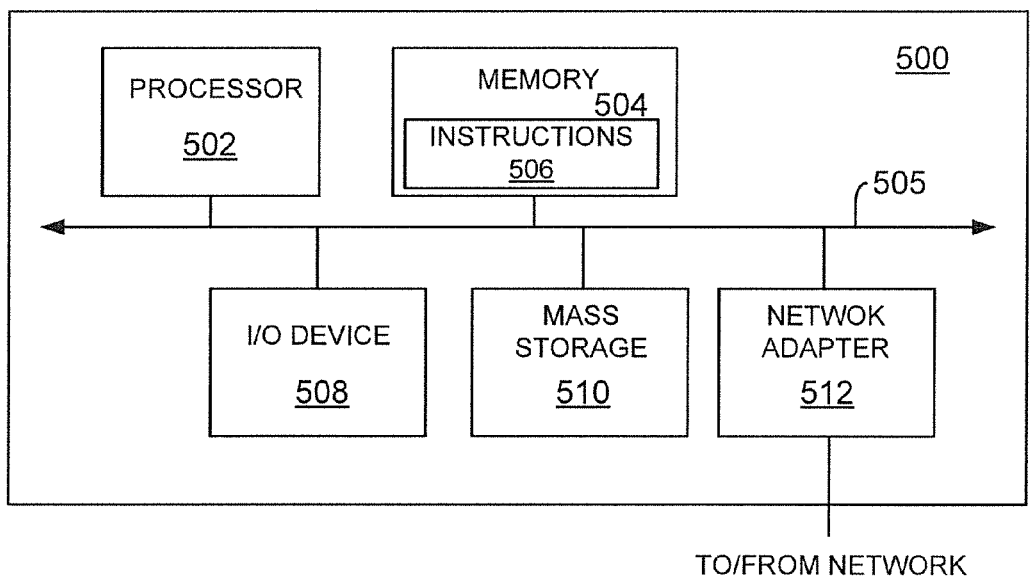
FIG. 5 shows an example of a computing system, used according to one embodiment.

FIG. 5 is a high-level block diagram showing an example of the architecture of a processing system 500 that may be used according to one embodiment. The processing system 500 can represent management console 120, client 104 or storage system 108, for example. The processing system may be used to generate a request for a storage volume and execute instructions for implementing the process steps of FIG. 2C. Note that certain standard and well-known components which are not germane to the present invention are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain embodiments, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like. The processing system 500 also includes one or more input/output (I/O) devices 508 coupled to the bus system 505. The I/O devices 508 may include, for example, a display device, a keyboard, a mouse, etc.

Cloud Computing

The techniques described above for allocating storage volumes are applicable in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments. The storage systems described above can be a part of the server layer for providing storage services.

Thus, a method and apparatus for allocating storage volumes have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for allocating a storage volume from among a plurality of storage volumes for storing information in a storage system, comprising:
    maintaining a plurality of groups for segregating the plurality of storage volumes based on utilization of the plurality of storage volumes, where storage volume utilization indicates an amount of storage space used for each storage volume at any given time;
    determining if a threshold value for using a group that was previously used to select another storage volume has been reached; wherein the threshold value is used to determine a number of times the group is used to allocate storage volumes, before selecting a next group from among the plurality of groups;
    starting at a beginning of the group for selecting the storage volume, when the threshold value is not reached; and
    selecting the next group for allocating the storage volume, when the threshold value has been reached; wherein the next group is selected based on a number of times other groups from among the plurality of groups have been used for allocating storage volumes.

2. The method of claim 1, wherein the plurality of groups include an empty group with storage volumes categorized as empty based on a programmable threshold level of utilization.

3. The method of claim 1, wherein the plurality of groups include a regular group with storage volumes categorized as regular based on a programmable threshold level of utilization.

4. The method of claim 1, wherein the plurality of groups include a full group with storage volumes categorized as full based on a programmable threshold level of utilization.

5. The method of claim 1, wherein the plurality of groups include a reserved group that is used for allocating storage volumes after an empty group and a regular group have been used for allocating the storage volume.

6. The method of claim 1, wherein the storage system that maintains the plurality of storage volumes is a cluster based storage system.

7. The method of claim 1, wherein the storage system that maintains the plurality of storage volumes is a non-cluster based storage system.

8. The method of claim 1, further comprising:
using a counter associated with each group for tracking a number of times each group has been traversed to allocate storages volume.

9. A non-transitory, machine readable storage medium storing executable instructions, which when executed by a machine, causes the machine to perform a method for allocating a storage volume from among a plurality of storage volumes used for storing information in a storage system, the method comprising:
maintaining a plurality of groups for segregating the plurality of storage volumes based on utilization of the plurality of storage volumes, where storage volume utilization indicates an amount of storage space used for each storage volume at any given time;
determining if a threshold value for using a group that was previously used to select another storage volume has been reached; wherein the threshold value is used to determine a number of times the group is used to allocate storage volumes, before selecting a next group from among the plurality of groups;
starting at a beginning of the group for selecting the storage volume, when the threshold value is not reached; and
selecting the next group for allocating the storage volume, when the threshold value has been reached; wherein the next group is selected based on a number of times other groups from among the plurality of groups have been used for allocating storage volumes.

10. The storage medium of claim 9, wherein the plurality of groups include an empty group with storage volumes categorized as empty based on a programmable threshold level of utilization.

11. The storage medium of claim 9, wherein the plurality of groups include a regular group with storage volumes categorized as regular based on a programmable threshold level of utilization.

12. The storage medium of claim 9, wherein the plurality of groups include a full group with storage volumes categorized as full based on a programmable threshold level of utilization.

13. The storage medium of claim 9, wherein the plurality of groups include a reserved group that is used for allocating storage volumes after an empty group and a regular group have been used for allocating the storage volume.

14. The storage medium of claim 9, wherein the storage system that maintains the plurality of storage volumes is a cluster based storage system.

15. The storage medium of claim 9, wherein the storage system that maintains the plurality of storage volumes is a non-cluster based storage system.

16. A system, comprising:
a processor for a storage system, executing a storage operating system for maintaining a plurality of groups for segregating a plurality of storage volumes based on utilization of a plurality of storage volumes used for storing information at the storage system, where storage volume utilization indicates an amount of storage space used for each storage volume at any given time;
wherein the storage operating system determines if a threshold value for using a group that was previously used to select another storage volume has been reached, where the threshold value is used to determine a number of times the group is used to allocate storage volumes, before selecting a next group from among the plurality of groups;
wherein a beginning of the group is used for selecting the storage volume, when the threshold value is not reached and the next group is selected when the threshold value has been reached; and
wherein the next group is selected based on a number of times other groups from among the plurality of groups have been used for allocating storage volumes.

17. The storage medium of claim 16, wherein the plurality of groups include an empty group with storage volumes categorized as empty based on a programmable threshold level of utilization.

18. The storage medium of claim 16, wherein the plurality of groups include a regular group with storage volumes categorized as regular based on a programmable threshold level of utilization.

19. The storage medium of claim 16, wherein the plurality of groups include a full group with storage volumes categorized as full based on a programmable threshold level of utilization.

20. The storage medium of claim 16, wherein the plurality of groups include a reserved group that is used for allocating storage volumes after an empty group and a regular group have been used for allocating the storage volume.

21. The storage medium of claim 16, wherein the storage system that maintains the plurality of storage volumes is a cluster based storage system.

22. The storage medium of claim 16, wherein the storage system that maintains the plurality of storage volumes is a non-cluster based storage system.

* * * * *